(12) United States Patent
MacLeod

(10) Patent No.: US 8,507,581 B2
(45) Date of Patent: Aug. 13, 2013

(54) STONE BASED COPOLYMER SUBSTRATE

(75) Inventor: Mathew D. MacLeod, West Hollywood, CA (US)

(73) Assignee: Green Folks & MacLeod, LLC, Los Angeles, CA (US)

( * ) Notice: Subject to any disclaimer, the term of this patent is extended or adjusted under 35 U.S.C. 154(b) by 0 days.

(21) Appl. No.: 13/193,140

(22) Filed: Jul. 28, 2011

(65) Prior Publication Data

US 2012/0071574 A1 Mar. 22, 2012

Related U.S. Application Data

(60) Provisional application No. 61/385,068, filed on Sep. 21, 2010.

(51) Int. Cl.
 *C08K 3/26* (2006.01)
(52) U.S. Cl.
 USPC .............. 523/124; 524/427; 524/451; 521/47
(58) Field of Classification Search
 USPC ................... 521/47; 523/124; 524/427, 451
 See application file for complete search history.

(56) References Cited

U.S. PATENT DOCUMENTS

| | | | |
|---|---|---|---|
| 3,026,209 A | 3/1962 | Niblack et al. | |
| 3,958,364 A | 5/1976 | Schenck et al. | |
| 4,078,331 A | 3/1978 | Savins et al. | |
| 4,078,332 A | 3/1978 | Savins | |
| 4,236,349 A | 12/1980 | Ramus | |
| 4,607,074 A | 8/1986 | Hazelton et al. | |
| 4,795,768 A | 1/1989 | Ancker et al. | |
| 4,845,145 A | 7/1989 | Hazelton et al. | |
| 4,889,669 A | 12/1989 | Suzuki | |
| 5,030,662 A | 7/1991 | Banerjie | |
| 5,212,223 A | 5/1993 | Mack et al. | |
| 5,702,787 A | 12/1997 | Andersen et al. | |
| 5,705,239 A | 1/1998 | Andersen et al. | |
| 5,709,934 A | 1/1998 | Bell et al. | |
| 5,738,921 A | 4/1998 | Andersen et al. | |
| 5,922,800 A | 7/1999 | Crotty et al. | |
| 5,928,741 A | 7/1999 | Andersen et al. | |
| 5,973,049 A | 10/1999 | Bieser et al. | |
| 6,030,673 A | 2/2000 | Andersen et al. | |
| 6,211,500 B1 | 4/2001 | Cochran, II et al. | |
| 6,362,252 B1 | 3/2002 | Prutkin | |
| 6,401,962 B1 | 6/2002 | Littlejohn et al. | |
| 6,482,872 B2 | 11/2002 | Downie | |
| 6,503,616 B1 | 1/2003 | Jalan | |
| 6,571,980 B2 | 6/2003 | Littlejohn et al. | |
| 6,878,199 B2 | 4/2005 | Bowden et al. | |
| 6,881,937 B2 | 4/2005 | Swiontek | |
| 6,951,900 B2 | 10/2005 | Blanchard et al. | |
| 7,067,651 B2 | 6/2006 | Poovarodom et al. | |
| 7,074,918 B2 * | 7/2006 | Medoff et al. | ......... 536/56 |
| 7,098,292 B2 | 8/2006 | Zhao et al. | |
| 7,160,977 B2 | 1/2007 | Hale et al. | |
| 7,172,814 B2 | 2/2007 | Hodson | |
| 7,214,414 B2 | 5/2007 | Khemani et al. | |
| 7,241,832 B2 | 7/2007 | Khemani et al. | |
| 7,332,119 B2 | 2/2008 | Riebel | |
| 7,344,784 B2 | 3/2008 | Hodson | |
| 7,368,503 B2 | 5/2008 | Hale | |
| 7,375,162 B2 | 5/2008 | Strebel et al. | |
| 7,482,053 B2 | 1/2009 | Swiontek | |
| 7,520,929 B2 | 4/2009 | Woerdeman et al. | |
| 7,576,145 B2 | 8/2009 | Mezza | |
| 7,585,530 B2 | 9/2009 | Etchells et al. | |
| 7,671,101 B2 | 3/2010 | Gaserod et al. | |
| 7,691,305 B2 | 4/2010 | Sutton et al. | |
| 7,740,952 B2 | 6/2010 | Hausmann et al. | |
| 7,781,510 B2 | 8/2010 | Yalvac et al. | |
| 7,790,784 B2 | 9/2010 | Nasr et al. | |
| 7,967,904 B2 | 6/2011 | Bowden et al. | |
| 8,083,064 B2 | 12/2011 | Boswell et al. | |
| 2001/0015354 A1 | 8/2001 | McCarthy et al. | |
| 2003/0050378 A1 | 3/2003 | Blanchard et al. | |
| 2004/0173779 A1 | 9/2004 | Gencer et al. | |
| 2004/0185287 A1 | 9/2004 | Reighard et al. | |
| 2004/0209073 A1 | 10/2004 | Rosenbaum et al. | |
| 2005/0222311 A1 | 10/2005 | Richter et al. | |
| 2006/0100335 A1 | 5/2006 | Yalvac et al. | |
| 2006/0246309 A1 | 11/2006 | Marshall et al. | |
| 2007/0191510 A1 | 8/2007 | Chaiko | |
| 2007/0227087 A1 | 10/2007 | Nasr et al. | |
| 2008/0172981 A1 | 7/2008 | Iverson | |
| 2008/0311261 A1 | 12/2008 | Gullick | |
| 2009/0012213 A1 | 1/2009 | Schmaucks et al. | |
| 2009/0047499 A1 | 2/2009 | Tilton | |
| 2009/0047511 A1 | 2/2009 | Tilton | |
| 2009/0047525 A1 | 2/2009 | Tilton | |
| 2009/0062413 A1 | 3/2009 | Adur et al. | |
| 2009/0162683 A1 | 6/2009 | Douard | |
| 2009/0286023 A1 | 11/2009 | Dobreski et al. | |
| 2009/0324979 A1 | 12/2009 | Roussel et al. | |
| 2010/0003431 A1 | 1/2010 | Raybuck | |
| 2010/0048791 A1 | 2/2010 | Vucak et al. | |
| 2010/0209726 A1 | 8/2010 | Coover et al. | |
| 2010/0314162 A1 | 12/2010 | Gardner et al. | |
| 2010/0316854 A1 | 12/2010 | Gardner et al. | |
| 2011/0105667 A1 | 5/2011 | Brenner et al. | |
| 2011/0172326 A1 | 7/2011 | Weismann et al. | |

\* cited by examiner

FOREIGN PATENT DOCUMENTS

WO 2009/103052 8/2009

*Primary Examiner* — Kriellion Sanders
(74) *Attorney, Agent, or Firm* — Proskauer Rose LLP

(57) ABSTRACT

A stone based copolymer substrate includes calcium carbonate ($CaCO_3$) from approximately fifty to eighty-five percent (50-85%) by weight and varying in size generally from 1.0 to 3.0 microns, high-density polyethylene (HDPE) from approximately two to twenty-five percent (2-25%) by weight and a biopolymer from approximately two to twenty-five percent (2-25%) by weight. The substrate may include a biodegradation additive from approximately three fourths of a percent to two percent (0.75-2%) by weight. By selectively adjusting the ranges of the substrate's components, various products can be made to replace current tree-based and plastic-based products. The substrate can be configured to be tear proof, water proof, fade resistant and fire retardant while utilizing less energy and producing less waste during its manufacture. In an exemplary embodiment of the invention, the stone used in the substrate includes limestone.

11 Claims, No Drawings

STONE BASED COPOLYMER SUBSTRATE

FIELD OF THE INVENTION

The present invention generally relates to a replacement composition for tree based, paper, hard paper and plastic goods. More particularly, the present invention relates to a limestone based copolymer substrate, which may be used as a replacement composition for a myriad of goods currently manufactured from tree-based or petroleum-based substances.

BACKGROUND OF THE INVENTION

Paper products are an integral part of all industrialized economies today in spite of the recent rise of the green movement to go "paperless." Every year, Americans use more than 90 million tons of paper and paperboard. That's an average of 700 pounds of paper products per person each year. Every year in America, more than 2 billion books, 350 million magazines, and 24 billion newspapers are published. The United States is the world's leading producer of paper and paperboard, with over 500 mills in operation. Worldwide, there are approximately 10,000 mills producing about 300 million metric tons of paper and paperboard each year. The United States alone produces about 87 million metric tons of paper and paperboard, representing nearly one-third of the world's total production. Tree based products include paper, paper cups, paper plates, envelopes, cardboard packaging, containers, and boxes to name just a few. Paperboard is the stiff type of paper often referred to as "cardboard." Paperboard is used in food packaging (such as cereal boxes), and is used to make many other types of products such as shoe boxes, video game boxes, book covers, etc.

In the papermaking process, wood is first chipped into small pieces. Then water and heat, and sometimes chemicals, are added to separate the wood into individual fibers. The fiber is mixed with lots of water (and often recycled fiber), and then this pulp slurry is sprayed onto a huge flat wire screen which is moving very quickly through the paper machine. Water drains out and the fibers bond together. The web of paper is pressed between rolls which squeeze out more water and press it to make a smooth surface. Heated rollers then dry the paper, and the paper is slit into smaller rolls, and sometimes into sheets, and removed from the paper machine. Producing paper is a complicated process which requires huge amounts of energy while resulting in significant amounts of waste material.

Paper production accounts for about 35% of felled trees, and represents 1.2% of the world's total economic output. Recycling one ton of newsprint saves about 1 ton of wood while recycling 1 ton of printing or copier paper saves slightly more than 2 tons of wood. Trees raised specifically for pulp production only account for 16% of world pulp production, old growth forests account for 9% and second—and third— and more generation forests account for the balance. Most pulp mill operators practice reforestation to ensure a continuing supply of trees, however future demand is constantly increasing due to the ever present human population increase. It has been estimated that recycling half the world's paper would avoid the harvesting of 20 million acres (81,000 km$^2$) of forestland.

Plastics are also an integral part of industrialized economies. Plastics are typically petroleum based and require huge amounts of processing, energy and costs to produce. Unfortunately, petroleum is derived from crude oil which is currently in limited supply and high demand. Less than half of every barrel of crude oil extracted from the ground is refined into gasoline. The rest of the barrel is used in the production of an estimated 57 other major types of goods—goods like kerosene, asphalt, antifreeze, cleaning fluids, laundry detergents, paint, pharmaceuticals, cosmetics, hygiene products, diapers, dvds, and even the waxes in chewing gum. To further complicate matters, oil is primarily purchased from hostile and politically unstable nations located in the Middle East. Plastic products are also typically not biodegradable which leads to disposal problems once the life of the product is over.

As can be appreciated and understood, finding a viable alternative to tree-based and petroleum-based products which are cheaper, requires less energy to manufacture and are biodegradable would result in economical savings while simultaneously benefiting the environment. Accordingly, there is a need for finding a replacement substrate for paper and plastic products. The present invention fulfills these needs and provides other related advantages.

SUMMARY OF THE INVENTION

An exemplary embodiment of a stone based copolymer substrate of the present invention includes calcium carbonate (CaCO3) from approximately fifty to eighty-five percent (50-85%) by weight. Calcium carbonate may be derived from limestone. The substrate also includes a high-density polyethylene (HDPE) from approximately two to twenty-five percent (2-25%) by weight. The substrate also includes a biopolymer from approximately two to twenty-five percent (2-25%) by weight.

In exemplary embodiments, the calcium carbonate is in a crushed form varying in size generally from 1.0 to 3.0 microns. Alternatively, the calcium carbonate may have a median particle size of less than 5.0 microns.

In another exemplary embodiment, the substrate may include talc from approximately two to seventeen percent (2-17%) by weight. The talc may be in a crushed form varying in size generally from 1.0 to 3.0 microns.

In another exemplary embodiment, the substrate may include a biodegradation additive from approximately three fourths of a percent to two percent (0.75-2.0%) by weight. The biodegradation additive may include additives such as those sold under the trademark ECOPURE (which can include any one of a series of formulations of organic molecules or polymer chains that are tailored to non-biodegradable polymers) or any similar such biodegradation additive known in the art.

In exemplary embodiments the biopolymer may include polymer of lactic acid (PLA), poly-hydroxybutanoate (PHB), Polyhydroxyalkanoates (PHA), Nylon 610, Nylon 611 or Polyactic Acid.

In another exemplary embodiment, the high-density polyethylene may include recycled high-density polyethylene.

An exemplary process for manufacturing a recycled high-density polyethylene substrate includes the steps of: extracting recycled high-density polyethylene from a plurality of existing plastic products; mixing a substrate including calcium carbonate (CaCO3) from approximately fifty to eighty-five percent (50-85%) by weight, the recycled high-density polyethylene from approximately two to twenty-five percent (2-25%) by weight, a biopolymer from approximately two to twenty-five percent (2-25%) by weight and a biodegradation additive from approximately three fourths of a percent to two percent (0.75-2%) by weight; and then forming the substrate into a new product. Thereafter, the new product may be disposed into a landfill or a microorganism rich environment. The biodegradation additive facilitates and promotes recycling of the product.

An exemplary process for manufacturing a limestone based copolymer substrate pellet includes the steps of: blending a substrate including a high-density polyethylene from approximately two to twenty five (2-25%) by weight, a biopolymer from approximately two to twenty-five percent (2-25%) by weight forming a copolymer, and crushed calcium carbonate (CaCO3) from approximately fifty to eighty-five percent (50-85%) by weight varying in size generally from 1.0 to 3.0 microns; and then forming the substrate into a plurality of pellets, such that the plurality of pellets are utilized in secondary manufacturing techniques for a variety of goods.

DETAILED DESCRIPTION OF THE PREFERRED EMBODIMENTS

The present invention is a stone based copolymer substrate. More specifically, the present invention is a stone based copolymer substrate that can be used in current manufacturing processes as a paper and plastic goods replacement. Additionally, the stone based copolymer substrate may be biodegradable. The substrate is an organic and sustainable combination of powdered stone and a copolymer including high-density polyethylene and a biopolymer. Due to the substrate being stone based it can be used to produce tear proof, water proof, fade resistant and fire retardant products. Additionally, the substrate is manufactured free of toxins resulting in a 100% non-toxic finished product. The substrate is also 100% recyclable. An advantage of the substrate is that it can be manufactured completely within the United States with 100% American sourced materials. Finally, the manufacturing process requires relatively low energy consumption. In an exemplary embodiment of the present invention, the stone substrate is limestone.

An exemplary embodiment of the present invention includes calcium carbonate (CaCO3) from fifty to eighty-five percent (50-85%) by weight in the form of 1.0-3.0 microns in size, high-density polyethylene (HDPE) from two to twenty-five percent (2-25%) by weight and a biopolymer from two to twenty-five percent (2-25%) in weight.

Limestone is processed such that the CaCO3 is ground or pulverized into a size ranging generally between 1.0 to 3.0 microns in size. The copolymer is also prepared where the HDPE and biopolymer are blended together. Then the CaCO3 is blended into the copolymer to result in the substrate. The substrate can then be manufactured into a range of products and goods through thermoforming, blow molding, injection molding, bubble forming, vacuum forming and pelletization. Pelletizing is the process of compressing or molding the substrate into the shape of a small pellet. These pellets can then be shipped to various manufacturers who use the pellets in their specific manufacturing processes such as injection molding.

Limestone has been found to be cheap, simple to process and widely abundant. Limestone is a sedimentary rock composed largely of the minerals calcite and aragonite, which are different crystal forms of calcium carbonate (CaCO3). Limestone makes up about 10% of the total volume of all sedimentary rocks. It is to be understood by those skilled in the art that other stones (other than limestone) can be used to form the substrate as this disclosure is not intended to limit it solely to the use of limestone. For instance, dolomite may be used but has disadvantages. Dolomite is calcium magnesium carbonate and the magnesium is expensive to remove making the substrate significantly more expensive.

High-density polyethylene (HDPE) or polyethylene high-density (PEHD) is a polyethylene thermoplastic made from petroleum. It takes 1.75 kilograms of petroleum (in terms of energy and raw materials) to make one kilogram of HDPE. HDPE is commonly recycled, and has the number "2" as its recycling symbol. In 2007, the global HDPE market reached a volume of more than 30 million tons. The HDPE adds to the overall durability of the product, the heat tolerance of the product and the flexibility. The lesser the percentage of HDPE, the weaker the part will be and the lower the heat tolerance of the product will be. It may also be possible to replace HDPE with other suitable replacements, such as a thermoplastic urethane (TPU) or a thermoplastic elastomer (TPE).

A polymer is a large molecule (macromolecule) composed of repeating structural units. These subunits are typically connected by covalent chemical bonds. Although the term polymer is sometimes taken to refer to plastics, it actually encompasses a large class comprising both natural and synthetic materials with a wide variety of properties. Because of the extraordinary range of properties of polymeric materials, they play an essential and ubiquitous role in everyday life. This role ranges from familiar synthetic plastics and elastomers to natural biopolymers such as nucleic acids and proteins that are essential for life.

Biopolymers are polymers which are biodegradable, typically made by living organisms. Biopolymers may be comprised of starches, sugars, cellulose or made with synthetic materials. Since biopolymers are polymers, biopolymers contain monomeric units that are covalently bonded to form larger structures. Cellulose is the most common organic compound and biopolymer on Earth. About thirty-three percent of all plant matter is cellulose. The cellulose content of cotton is 90 percent and that of wood is 50 percent. Biopolymers include, but are not limited to, polymer of lactic acid (PLA), poly-hydroxybutanoate (PHB), Polyhydroxyalkanoates (PHA), Nylon 610, Nylon 611, and Polylactic Acid.

The cost analysis shows that raw materials contained in the substrate are approximately 6-10 cents on the dollar versus comparable paper and plastic products. Manufacturing of the substrate has approximately 1/10th of the labor costs of producing similar end products from tree based paper. Manufacturing of the product has approximately 1/8th the energy cost of producing similar end products from plastics. Incentivizing a change towards the substrate is that those large-scale companies which do adopt the substrate product will receive millions of dollars in tax rebates and carbon credits in addition to a savings of up to 30% on the purchase of this substrate versus paper or plastic. The profitability of a wide spread adoption of the use of the substrate in various products will be in the tens of billions of dollars annually, assuming very conservatively these products only garner a 10% share of the (US) market alone. The Unites States production of plastics is at a staggering $374 billion dollars per year and growing. The polymer substrate is extremely versatile because it may be formed using any one of the plastics forming methods currently known in the art including, but not limited to: thermoforming, blow molding, injection molding, bubble forming, pelletizing, master batching, vacuum forming or any other similar method.

Products potentially manufactured from the limestone based copolymer substrate include, but are not limited to, paper plates, food trays, disposable cups, to-go containers, pizza boxes, Chinese food containers, coffee cup lids, retail food packaging, water bottles, soft drink containers, fast food packaging, milk cartons, frozen food packaging, shipping packaging and materials, candy packaging, medical packaging, waste containers, document bins, display boxes, drink holders, egg cartons, airline food packaging, hospital meal service items, prison meal service items, military MRE packaging and containers, disposable liquid vessels, school lunch service items, hot liquids containers, hot liquids containers, automotive parts, office supplies, household items, plastic cutlery, light fixtures, accessories for light fixtures, disposable plastic articles such as plastic gloves, cosmetics holders, spectacle frames, medical apparatus dental products, hardware products, plastic bags, plastic conduits, plastic hoses, plastic rods and bars, sheet plastic, protective plastics, display assemblies, novelty items, plastic ornaments, arts and crafts implements, polymer based cladding, acoustical panels, building panels, building moldings and accessories, gaskets, fasteners, jointing materials, shields, polymer-based bumpers, flooring materials, and any variety of materials manufactured from the same.

In an exemplary embodiment, talc was added to the substrate. The talc was generally about 3.0 microns in size and was from about 2-17% in weight of the substrate. In the early stages of developing the substrate, talc was found to act as a lubricant and made certain manufacturing processes easier. For instance, the talc would help a mixture of the substrate easily glide through a mechanical screw and gears used in the manufacturing process. It is to be understood by one skilled in the art that other lubricants may be included in the substrate for ease of various manufacturing processes.

In another exemplary embodiment, a biodegradation additive may be included in the substrate. One such biodegradation additive is made by Bio-Tec Environmental of Albuquerque, N. Mex. This additive is sold under the tradename ECOPURE, which can include any one of a series of formulations of organic molecules or polymer chains that are tailored to non-biodegradable polymers, such as polymers found in finished polymer products. The ECOPURE biodegradation additive is a proprietary blend of organic materials that does not modify the base resin to which it is added. The latter retains all its original properties and shelf life. The ECOPURE biodegradation additive is melt-compounded into a masterbatch carrier resin, which is then pelletized. The ECOPURE biodegradation additive initiates and promotes solely a biodegradation process, and does so only in the presence of microorganisms such as are found in landfills and similar environments.

The biodegradation additive is added to the substrate to promote the end product to break down once it is discarded into a landfill. A landfill is an environment full of microorganisms. The biodegradation additive helps to promote the natural recycling of the product in nature. Typically, plastic products do not degrade well, or at all, once discarded in a landfill. The substrate of the present invention is comprised of limestone, which is naturally occurring sedimentary rock, and the copolymer. However, the HDPE from the copolymer is essentially a plastic. There exists a very large market of recycled HDPE currently in the United States. Recycled HDPE can be used in the substrate along with the biodegradation additive. This means that the total supply of plastics in landfills can be reduced, as the present invention creates products from existing HDPE and then breaks it down naturally once the product is discarded.

The percentages of the substrate can be manipulated to create products of varying durability, strength, cost and biodegradability. As can be seen by one skilled in the art, the lower the percentage amount of HDPE used in the substrate the quicker the product will degrade in a landfill. Also, the use of an increased percentage of biopolymer results in a higher cost but also decreases the time for the product to degrade.

Generally, the limestone based copolymer substrate comprises: (A) calcium carbonate ($CaCO_3$) from fifty to eighty-five percent (50-85%) by weight in the form of 1.0-3.0 microns in size; (B) high-density polyethylene (HDPE) from two to twenty-five percent (2-25%) by weight; and (C) a biopolymer from two to twenty-five percent (2-25%) in weight. Alternatively, talc may be added to the substrate from two to 17 percent by weight in the form of about 3.0 microns in size. Also alternatively, a biodegradation additive may be used in the substrate to promote degradation of the end product once in a microorganism rich environment such as a landfill. The required percentages of each component produced from the substrate falls within the ranges listed above. However, specific percentages of each component's composition are dependent upon the desired end product and its desired mechanical properties. Depending on the particular formula used, within these ranges, the substrate's properties will vary and make it suitable for various applications, including but not limited to, cups, plates, trays, envelopes, packaging, fast food containers, drink bottles, pizza boxes, retail product displays, building materials, auto parts, medical devices and other such products discussed herein.

One example of the substrate, which has properties suitable for food trays, consists of the following formula: (A) 70-80% Calcium Carbonate; (B) 18.5% HDPE and biopolymer; (C) 1% fill of biodegradation additive; and (D) 0.2% Talc. A food tray was made following the process detailed hereafter. Generally, the composition of the substrate requires the application of $CaCO_3$ evenly dispersed throughout the resin blend in various amounts ranging from 50%-85% by weight. First, whether the $CaCO_3$ is treated or untreated, its size generally ranges from 1.0-3.0 microns. Second, the Talc is in a powder form in sizes ranging from 1.0-3.0 microns and is then sifted and blended into the $CaCO_3$. The amount of Talc is in the ratio of 2-17% by weight. The $CaCO_3$ and Talc must be blended in a dry and powdered state.

The manufacturing process also required the biopolymer to be heated to a range of between 150 and 350 degrees F. and involves the agitation of the heated polymers for a period of time between 1-4 hours prior to filler introductions. The process required a marriage of the heated biopolymer slurry and the HDPE slurry. The slurry of biopolymer and HDPE must be combined while the thermodynamically activated HDPE is combined with thermodynamically activated biopolymer at temperatures in the 100-300 Fahrenheit range. Then the two polymer slurries must be added together and agitated for a period of time between 1-4 hours.

The blend of $CaCO_3$ and Talc must be added in an even fill to polymer mass ratio whereas by weight the polymer is between 20-50% of the filler weight. Under continuous heated agitation the slurry containing 50%-85% $CaCO_3$/Talc based mineral mix is agitated for a period of 1-4 hours under constant heat ranges from 150-300 degrees F. There is cohesion between the biopolymer and the calcium carbonate at a specific temperature value between 150 and 300 degrees Fahrenheit. The mineral added slurry on steady agitation is ready for extrusion to any thermodynamic plastics extrusion equipment such as bubble form, thermo form, injection mold and rotary molds.

There must be a short thermal process in correlation to the slurry agitation within specific time parameters prior to either the vacuum forming or an injection molding processes dependent upon end product. There is an injection of air in the majority of end product processes that is directly relevant to the substrate's native characteristic as applied to end product and must be observed as a product specific time value.

The next step is to blend the biopolymer and HDPE in a combination relevant to the rigidity requirements of the finished with reference to degradability, weight, and end use of the product. The slurry is then dispersed with the CaCO3 at a fill rate of between 50 and 85 percent and trace amounts of talc are mixed with the CaCO3. This is conducted with enough heat and agitation to allow for the ingredients to combine and then is either fed into a blowmold center fed assembly for products related to that uniform process. In the case of end products that need to be injection molded the slurry is fed into the hopper and is dragflowed to the nozzle and thus extruded. In the instance of an end product that needs blown film extrusion the substrate is extruded in its molten slurry form extruded through a die and is then vertically collapsed and rolled into a film which then can be used in a thermoforming process to create thin film substrates.

In the early stage of production and development of the slurry process there were many difficulties in producing the substrate in a balanced and even dispersion. Many different methods and mix ratios we tried and tested before discovering the presently disclosed slurry process. By combining the biopolymer and HDPE in the slurry process separately and applying heat for several hours the layers of polymer became more uniformly joined and then it is able to separately add the fill load of minerals with a uniform and smooth dispersion. This technique ultimately led to a successful batch due to the different thermal qualities of the polymers in question and a dramatically improved uniform fill ratio. This in turn led to the finished substrates native cost saving and highly efficient durability and molding qualities.

The end percentage ratio of this invention is what is most prominent in the products unique nature and is represented at a value less than 20% of gross composite weight is non calcium carbonate and a value of 4-19% of gross volume is not mineral based but is still a reclaimable, degradable inclusion set to meet the products end user requirements for rigidity, form and weight. The formulation of the substrate is dependent upon the desired end product's mechanical characteristics and is accordingly dependent upon the (1) gauge of substrates final form, (2) the required rigidity, (3) the final weight requirements, and (4) the end consumer usage.

It is also discovered that by combining certain ingredients in a slurry and treating them as one would commonly treat environmentally ill trepidations such as petroleum based plastics, Styrofoam and wood paper pulp, it has been found that the use of this substrate is the same as in many of the same manufacturing processes as the aforementioned mass produced toxin rich materials without any of the detrimental effects of the production of said industrial mainstays.

The virtues of using calcium carbonate as related to calcite over other forms such as aragonite or dolomite is directly relative to extra processes needed to extract the heavy metals in dolomite and the thermodynamic instability aragonite in addition to the lower hardness and specific gravity of calcium carbonate which has a hardness value of 2.5 and a specific gravity of 2.7 lower than both of the aforementioned alternative minerals and thus more easily processed and manufactured. As well as less wear and tear on tools and equipment.

As discussed above, by varying the required percentages of each component with the ranges set forth herein, different substrate qualities are achieved. Additionally, it has been discovered that by combining newly available biopolymers with a combination of pulverized 1.0-3.0 micron limestone and a balance of trace elements of reclaimed high-density polyethylene and optionally powder fine talc in small percentages by way of slurry, controlled agitation, thermal interaction, various vacuum processes and injection molding applications the following substrate resulted:

1. A malleable and extremely cohesive substrate is developed.
2. An easily formable, shapeable material may be extruded up to several inches.
3. A dedicated pseudo polymer like substance is achieved.
4. A 99% sustainable materials based substrate is achieved.
5. A 100% recyclable substrate is achieved.
6. A 100% water resistant substrate is achieved.
7. An extraordinarily flame retardant substrate is achieved.
8. An extremely rigid substrate is achieved.
9. An extremely tear resistant substrate is achieved.
10. An extremely fade resistant substrate is achieved.
11. A 100% non-toxic finished substrate is achieved.
12. A 100% non-toxic reclamation process is achieved.
13. A 100% pollutant free manufacturing model is achieved.
14. A 100% bleach and acid free manufacturing chemistry is achieved.

There are many advantages of the substrate of the present invention. For instance, limestone is the planet's single most abundant mineral covering nearly 10% of the world's surface. The biopolymers used in the substrate are sourced from sustainable plant based alcohols instead of petroleum-based oils. The manufacturing process uses very little electricity and water while also using no toxins, bleaches or acids. The end product is food grade, biodegradable, and recyclable and reverts to a powder state when incinerated or degraded. The end product is completely environmentally safe throughout its entire life cycle. For every metric ton of tree paper products which are replaced by the substrate, the following resources are not consumed: 4 tons of virgin timber are saved, 24,000 gallons of water are saved, 156 pounds of solid waste are not introduced into the environment, and 200 pounds of airborne chemicals are not introduced into the air. The end product is usable on a wide variety of materials that currently rely upon plastic and polymers.

Rogers City located in the North East corner of the Michigan peninsula bordering Lake Huron could be chosen as the site of the first and primary production headquarters of the substrate due to the location of one of the largest limestone deposit densities in the world being in this area and also having very easy access to Detroit, one of the hardest hit cities in the current economic crisis. (It is to be understood by those skilled in the art that Limestone can be excavated from a multitude of locations around the world.) This deposit of limestone is conveniently located in the center of major transit routes giving relative direct access to most of the major United States regions and also to Canada by way of the Great Lakes. Lost automotive industrial jobs could be replaced with green production and manufacturing positions. A quality American industrial labor pool at a very budget friendly wage is therefore easily accessible. Additionally, by opening up a new manufacturing industry in the Rogers City area, it would be received publicly in a very positive public light. Opening a green business in this area is a very capital friendly position with relation to tax credits and $100-$200 million in federal and state grants which are likely to be received. Due to all of the above mentioned qualities, capabilities and environmental benefits, the wide spread adoption and use of the substrate is a simple and proactive way to contribute to the reduction of both global warming, deforestation and global waste. The inventor contemplates sourcing the substrate from any number of location in the United States and internationally.

Although several embodiments have been described in detail for purposes of illustration, various modifications may be made to each without departing from the scope and spirit of the invention. Accordingly, the invention is not to be limited, except as by the appended claims.

What is claimed is:

1. A stone based copolymer substrate, comprising
   a copolymer resin blend formed by a thermodynamic combination of heated high-density polyethylene (HDPE) slurry in an amount from approximately two to twenty-five percent (2-25%) by weight of the substrate with a biopolymer in an amount from approximately two to twenty-five percent (2-25%) by weight of the substrate that has been thermodynamically activated by heating to between 150 and 350 degrees F., the thermodynamic combination achieved by agitation and heating to between 150 and 300 degrees F. for a period of time, the biopolymer being biodegradable and made from living organisms or chemically synthesized; and
   calcium carbonate (CaCO3) having a particle size of less than 5 microns in an amount from approximately fifty to eighty-five percent (50-85%) by weight of the substrate blended with the copolymer resin blend using heated agitation between 150 and 300 degrees F. for 1 to 4 hours, thereby forming a cohesive dispersion.

2. The composition of claim 1, wherein the calcium carbonate is in a crushed form varying in size generally from 1.0 to 3.0 microns.

3. The composition of claim 1, including talc in an amount from approximately two to seventeen percent (2-17%) by weight.

4. The composition of claim 3, wherein the talc is in a crushed form varying in size generally from 1.0 to 3.0 microns.

5. The composition of claim 1, including a biodegradation additive in an amount from approximately three fourths of a percent to two percent (0.75-2.0%) by weight.

6. The composition of claim 1, wherein the biopolymer comprises polymer of lactic acid (PLA), poly-hydroxybutanoate (PHB), or polyhydroxyalkanoates (PHA).

7. The composition of claim 1, wherein the high-density polyethylene comprises recycled high-density polyethylene.

8. A limestone based copolymer substrate, comprising
   a copolymer formed by thermodynamic combination of high-density polyethylene (HDPE) and a biopolymer, the HDPE in an amount from approximately two to twenty-five percent (2-25%) by weight of the substrate, the biopolymer being thermodynamically activated by heating to between 150 and 350 degrees F., in an amount from approximately two to twenty-five percent (2-25%) by weight of the substrate, the thermodynamic combination achieved using agitation for 1 to 4 hours at a temperature between 150 and 300 degrees F., the biopolymer being biodegradable and made from living organisms or chemically synthesized;
   a biodegradation additive in an amount from approximately three fourths of a percent to two percent (0.75-2%) by weight of the substrate within the copolymer; and
   calcium carbonate (CaCO3) in an amount from approximately fifty to eighty-five percent (50-85%) by weight of the substrate and varying in size generally from 1.0 to 3.0 microns that is blended with the copolymer using heated agitation at between 150 and 300 degrees F. for 1 to 4 hours thereby forming a uniform dispersion.

9. A process for manufacturing a high-density polyethylene substrate, comprising the steps of:
   providing high-density polyethylene;
   providing a biopolymer that is biodegradable and made from living organisms or is chemically synthesized;
   heating the high density polyethylene to form a slurry;
   thermodynamically activating the biopolymer by heating to between 150 and 350 degrees F.;
   forming a resin blend by combining:
      the heated high-density polyethylene in an amount from approximately two to twenty-five percent (2-25%) by weight of the substrate, with
      the thermodynamically activated biopolymer in an amount from approximately two to twenty-five percent (2-25%) by weight of the substrate at a temperature between 150 and 300 degrees F.;
   cohesively blending calcium carbonate (CaCO3) in an amount from approximately fifty to eighty-five percent (50-85%) by weight of the substrate with the resin blend using continuous heated agitation for 1 to 4 hours at a temperature between 150 and 300 degrees F. to obtain a cohesive blend suitable for extrusion in plastics extrusion equipment;
   adding a biodegradation additive to the cohesive blend in an amount from approximately three fourths of a percent to two percent (0.75-2%) by weight of the substrate; and
   forming the substrate.

10. A process for manufacturing a high-density polyethylene substrate comprising the steps of:
    providing high-density polyethylene;
    providing a biopolymer that is biodegradable and made from living organisms or is chemically synthesized;
    heating the high-density polyethylene to form a slurry;
    thermodynamically activating the biopolymer by heating to between 150 and 350 degrees F. and agitating for a 1 to 4 hours;
    forming a polymer resin blend by combining the high-density polyethylene slurry with the thermodynamically-activated biopolymer at between 150 and 300 degrees F. with agitation for between 1 and 4 hours, such that the resin blend is in an amount from about 4 to 50% by weight of the substrate;
    using heated agitation for 1 to 4 hours at a temperature between 150 and 300 degrees F. to obtain a cohesive blend of calcium carbonate (CaCO3) having a particle size of less than 5 microns with the resin blend to form a uniform dispersion within the resin blend; and
    adding a biodegradation additive in an amount from approximately 0.75 to 2% by weight of the substrate to form the substrate.

11. The substrate of claim 10 wherein the biopolymer is polylactic acid.

* * * * *